INVENTORS.
JOHN M. HAMILTON
LEONARD L. HAAS

Paul + Paul
ATTORNEYS.

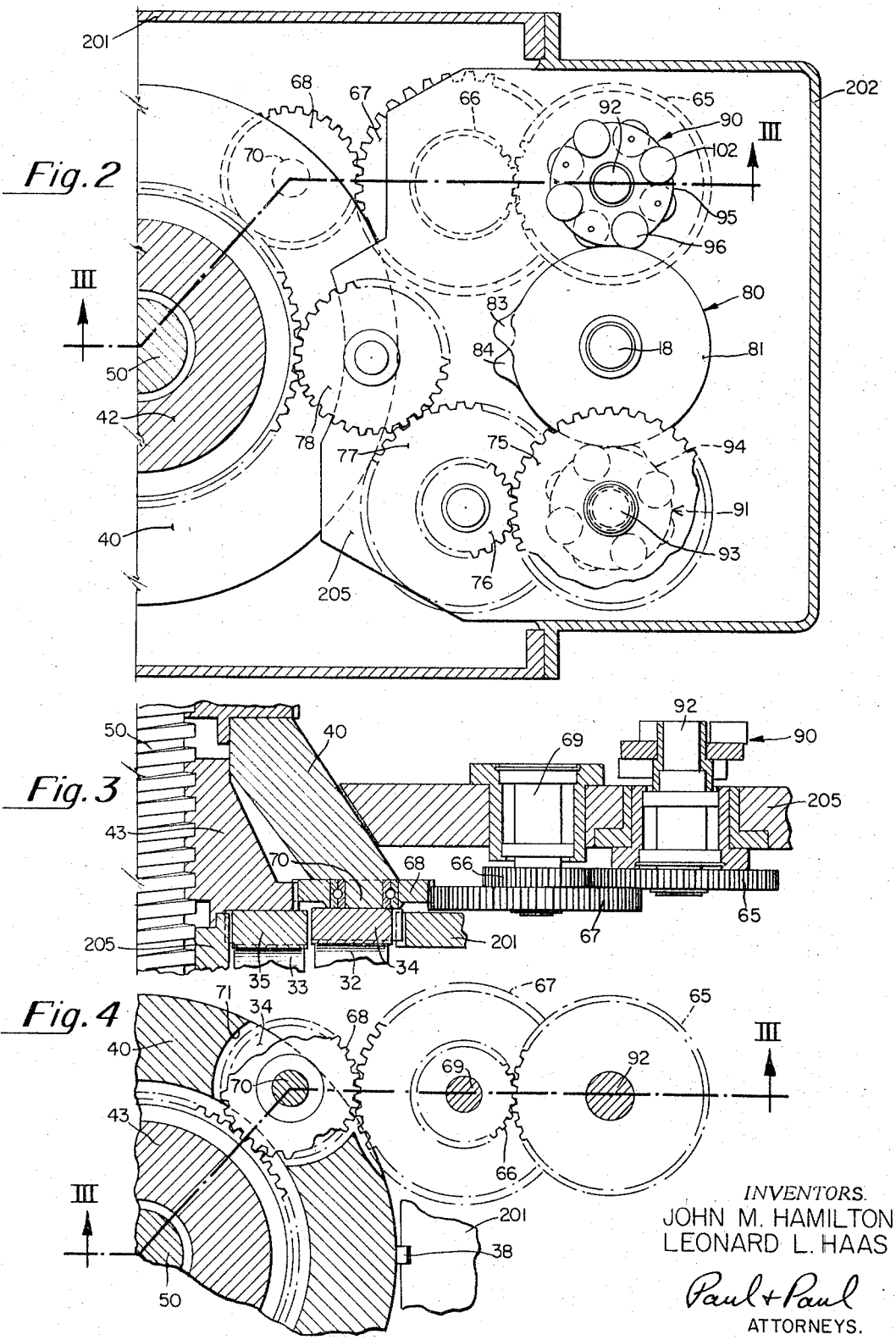

Feb. 20, 1968   J. M. HAMILTON ET AL   3,369,423
ROLLER ACTUATOR
Filed Nov. 28, 1966   5 Sheets-Sheet 3
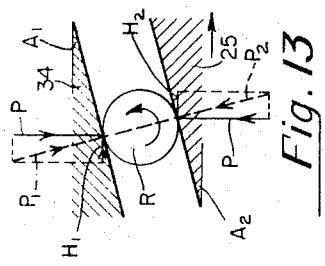
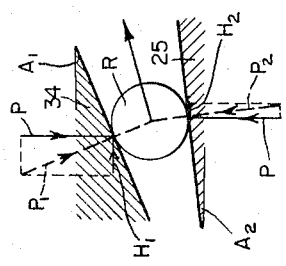
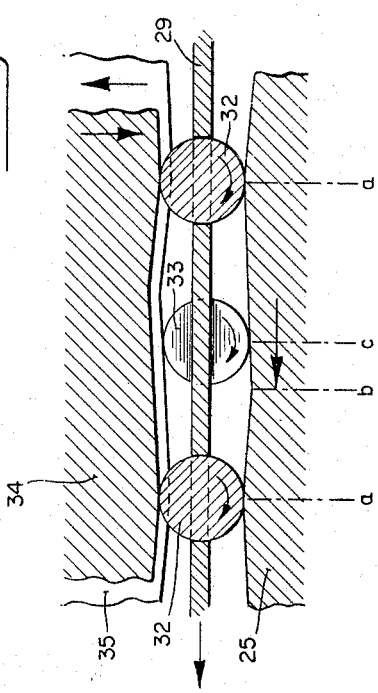
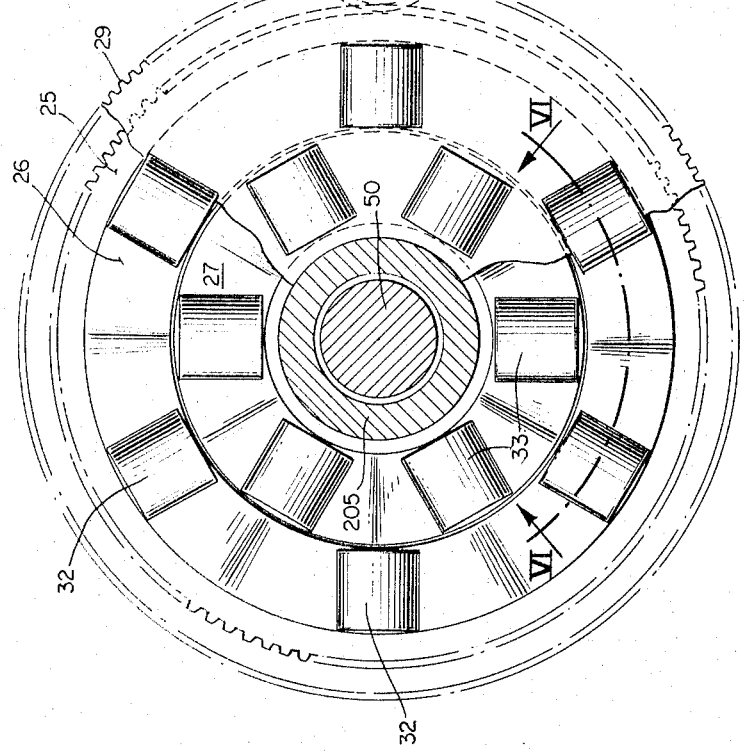
INVENTORS.
JOHN M. HAMILTON
LEONARD L. HAAS
Paul + Paul
ATTORNEYS.

INVENTORS.
JOHN M. HAMILTON
LEONARD L. HAAS

Paul + Paul
ATTORNEYS.

United States Patent Office 3,369,423
Patented Feb. 20, 1968

3,369,423
ROLLER ACTUATOR
John M. Hamilton, King of Prussia, and Leonard L. Haas, Downingtown, Pa., assignors to King of Prussia Research and Development Corporation, King of Prussia, Pa., a corporation of Pennsylvania
Filed Nov. 28, 1966, Ser. No. 597,336
11 Claims. (Cl. 74—424.8)

ABSTRACT OF THE DISCLOSURE

A roller actuator having rotationally-driven concentric inner and outer cam surfaces develops thrust forces which are applied alternately to first and second nuts to move a load stem axially. The first nut is surrounded by a non-rotatable thrust member. This member is interposed between an outer non-rotatable cam and the second nut. The member has an access slot for receiving a gear which is coupled to a non-concentric form of intermittent drive to return the first nut rotationally during the non-thrust-applying part of its cycle. A simple form of nut is used to return the stem in the no-load direction.

Description of the prior art

This application relates to rotary-to-linear-motion actuator mechanisms of the concentric cam types shown generally in the prior art patents to Florentino 2,151,094 and Hyde 2,583,775. Rotary-to-linear-motion actuator mechanisms of the non-concentric type are shown in Maroth Patent 2,836,985 and in the Bennett and Kron Patent 3,090,360.

Summary of the present invention

The present invention relates to a roller actuator mechanism of the concentric cam type having upper (or outer) and lower (or inner) nuts threaded on a load stem for moving the stem axially by means of thrust forces. A non-rotatable thrust member is interposed between the upper rotatable nut and the outer cam. It is concentric with and surrounds the lower or inner nut. This non-rotatable thrust member provides access to the inner nut and allows a non-concentric form of intermittent drive to used for imparting angular force to the inner nut at a point relatively close to the center axis of the load shaft. The use of this non-rotatable thrust member allows the outer or upper nut to be much smaller, and hence lighter in weight, and thus reduces the inertial load required to be moved by the intermittent mechanism. A continuously and synchronously rotating nut is employed to return the load stem in the no-load direction.

Brief description of the drawings

FIG. 2 is a plan view looking down along the line II—II of FIG. 1;

FIG. 3 is an elevational view, in section, along the line III—III of FIGS. 2 and 4, offset as indicated;

FIG. 4 is a plan view, in section, looking down along the line IV—IV of FIG. 1;

FIG. 5 is a plan view looking down along the line V—V of FIG. 1, offset as indicated;

FIG. 6 is an elevational view, in section, along the line VI—VI of FIG. 5;

FIGS. 13 and 14 are diagrams which are used in explaining a modification relating to the slopes of the rotatable power and non-rotatable thrust cams.

Description of the preferred embodiments

Figure 1:
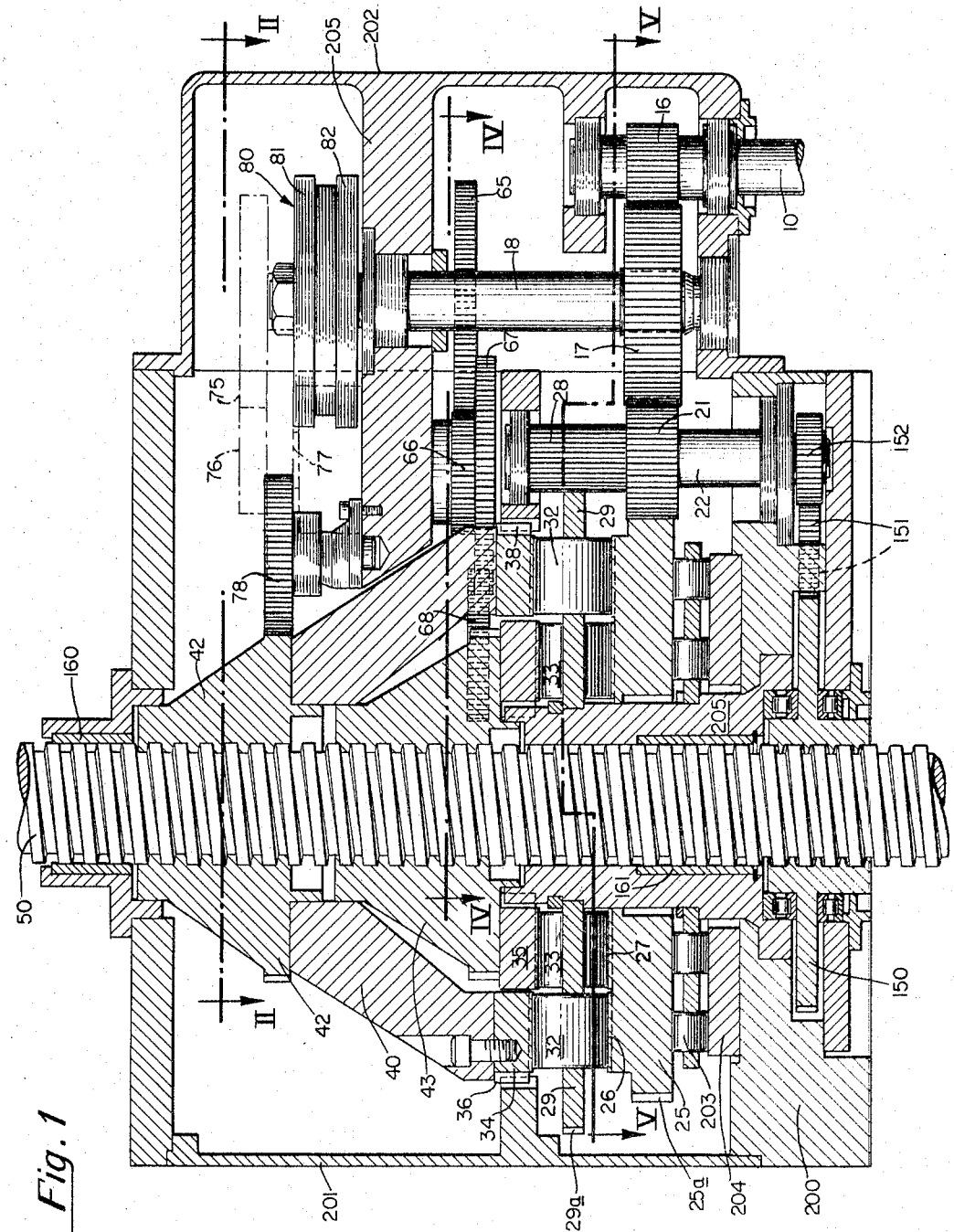
FIG. 1 is an elevational view in section of a one-way roller actuator of the concentric cam type embodying the present invention.
Figure 7:
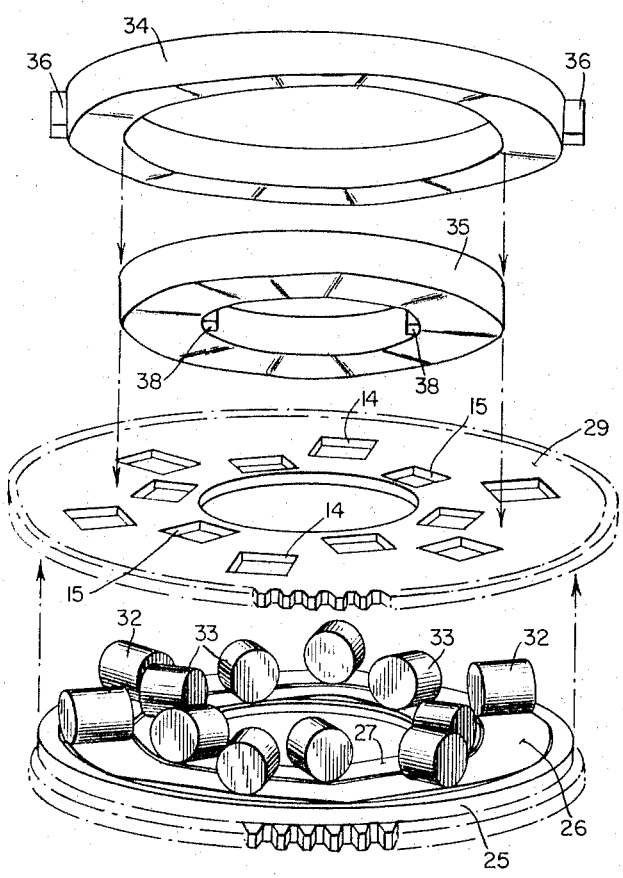
FIG. 7 is an exploded perspective view showing the rotational drive cam with its concentric inner and outer annular cam surfaces and its inner and outer series of rollers, the roller cage or retainer, and the non-rotational concentric inner and outer upper cam surfaces.

FIG. 1 is a cross-sectional view of the one-way roller actuator of the concentric cam type for converting rotary motion of the actuator to linear motion of a non-rotatable load stem 50. The non-rotatable stem 50 could be held stationary in its axial direction, in which case the actuator mechanism would move axially relative to the stem. However, it will be assumed, for the purpose of describing the invention, that the actuator mechanism is fixed and that the stem is moved.

The actuator mechanism of FIG. 1 is capable of applying a heavy thrust to the stem 50 in only one axial direction. The stem may be disposed vertically, or horizontally, or at any angle therebetween. It will be convenient to assume, for purposes of this description, that the stem 50 in FIG. 1 is vertically disposed and that the heavy-load direction is upward, as viewed in FIG. 1.

In FIG. 1, an input shaft 10 is driven rotationally by suitable drive means, not illustrated. Fixed to input shaft 10 is a pinion 16 which meshes with a gear 17 fixed to a cam shaft 18. Gear 17 also meshes with a pinion 21 fixed to a power shaft 22 and pinion 21 meshes with the peripheral teeth 25a of the rotatable main power cam 25. Also fixed to power shaft 22, above pinion 21, is a pinion 28 which engages the peripheral teeth 29a of a roller cage or retainer 29 whose function is to maintain equal spacing between the cam rollers 32 and 33 of an outer and inner series of cam rollers.

Roller retainer 29 is an annular disc having an outer ring of slots 14 and an inner ring or slots 15, the slots of both rings are uniformly spaced angularly. In the particular form shown in the drawing, the slots of the inner ring are staggered relative to those of the outer ring, six slots being shown in each ring, one for each of the rollers 32 and 33. There is 60° spacing between each slot 14 of the outer ring, 60° spacing between each slot 15 of the of the inner ring, and 30° spacing between the radial axes of the inner and outer slots. Roller retainer 29 is supported on a shoulder of a cartridge or sleeve 205 which extends upwardly from the main base plate 200.

The power cam 25 is a rotatable annular member having a toothed periphery in engagement with the drive pinion 21. The upper surface of drive cam 25 is contoured to have two concentric cam surfaces, an outer cam surface 26 and an inner cam surface 27. The two cam surfaces 26 and 27 have the same contours and the peaks of the inner cam 27 are in radial alignment with the peaks of the outer cam 26. In the illustrated embodiment, each of the cam surfaces 26 and 27 has six peaks, spaced 60° apart, and six low points, also spaced 60° apart. However, the low points are not located midway between the peaks. In FIGS. 5 and 6, the cam peaks are identified as a, the low points as b, and the mid-points between the peaks as c. The downwardly inclined ramp from a to b does not extend all the way to the mid-point c, and the mid-point c is rocated on the upwardly inclined ramp which extends from b to a. In the embodiment illustrated, the rollers 32 of the outer race are staggered with respect to the rollers 33 of the inner race, being midway therebetween. Thus, when the rollers 32, 33, of either the inner or outer cam surfaces are rolling up the cam ramp from *b* to *c*, the rollers of the other cam are also rolling upward, approaching the peak *a*. During this portion of the cycle, the thrust is applied by both sets of rollers 32 and 33.

Positioned above the outer ring of cam rollers 32 is an non-rotatable outer cam 34 which is fixed against rotation, as by the keys 36 which fit into keyways in the main housing 201. The non-rotational outer cam 34 has a contoured undersurface which is the mirror image of the cam surface 26 of rotatable power cam 25. The non-rotatable cam 34 is supported by the cam rollers 32 and moves vertically up and down in accordance with the rollers 32. Positioned above the inner ring of cam rollers 33 is a separate non-rotatable inner cam 35 which is fixed against rotation, as by the keys 38 which fit into keyways in the cam 34 and/or in the fixed sleeve 205. The non-rotatable inner cam 35 has a contoured undersurface which is the mirror image of the cam surface 27 of the rotatable power cam 25. The non-rotatable cam 35 is supported by the cam rollers 33 and moves vertically up and down with the rollers 33.

Threaded on stem 50 is cone-shaped rotatable lower or inner nut 43 whose undersurface lies adjacent the upper surface of the non-rotatable inner cam 35. Also threaded on stem 50 is a cone-shaped rotatable upper or outer nut 42.

In accordance with the present invention, a non-rotatable cone-shaped thrust member 40 is interposed between the flat upper surface of the non-rotatable outer cam 34 and the flat undersurface of the rotatable upper nut 42. In the drawing, the member 40 is shown bolted to the cam 34.

In prior art mechanisms, the thrust member 40 would have been a part of the upper nut 42 and hence would have been rotatable. Thus, the present invention may be considered as proposing that the upper nut be divided into two parts, an upper rotatable part 42 and a lower non-rotatable part 40 which surrounds and encompasses the lower or inner nut 43.

The non-rotatable member 40 which in accordance with the present invention is used for applying the thrust of the outer cam 34 to the upper nut 42, makes possible a non-concentric type of intermittent drive having certain advantages, discussed later.

When the rollers 32 of the outer cam pass the cam peaks *a* and roll down the downward slope between *a* and *b*, the outer non-rotatable cam 34 moves vertically downward, and as a consequence the non-rotatable thrust member 40 also moves vertically downward. Simultaneously, the rotatable upper nut 42 is being carried linearly upward by the load shaft 50 which is being lifted at this time by the inner cam rollers 33, the inner non-rotatable cam 35 and the inner or lower nut 43. It will be seen that unless something is done about it, the upward movement of nut 42 and the downward movement of thrust member 40 will cause a gap or space to form between the upper surface of the member 40 and the undersurface of the upper nut 42.

A similar space or gap would form between the upper surface of the inner non-rotatable cam 35 and the undersurface of the inner or lower nut 43 during that portion of the cycle when the outer cam 26 is lifting the load stem 50 by means of the outer rollers 32, outer non-rotatable cam 34, thrust member 40 and upper nut.

To prevent the spaces or gaps referred to above from developing intermittent means are provided for rotating downwardly the nut (42 or 43) which is not then in the thrust-applying portion of its cycle.

The roller actuator mechanism illustrated in the drawings and now being described is capable of lifting extremely heavy loads, and when designed for such heavy loads, the angle of incline or lift of the rotational or power cam 25 is made very small in order to obtain the mechanical advantage which flows therefrom. In a typical case, there may be a rise of only $\frac{1}{16}''$ between the low point *c* and the peak *a* of the power cam 25. In the illustrated embodiment, there are six peaks spaced at 60° separation around the annular cam surface 25. However, a 360° rotation of the cam 25 does not produce six cycles of cam action, for it requires a 120° movement of cam 25 to move the rollers through 60°. Thus, one 360° revolution of cam 25 is equal to only three cycles of cam action and, in the present example, would achieve a lift of only $\frac{3}{16}''$ were it not for the fact that the cam surfaces of the upper non-rotational cams 34 and 35 are also contributing to the lift. As a result, the total lift for a 360° rotation of the power cam 25, in the present example, is $\frac{6}{16}''$. With such a small lift for each rotation of the power cam 25, it will be seen that to achieve a satisfactory rate of linear movement of the load stem 50, the roller actuator mechanism must be operated at high rotational speed.

The pitch of the threads of the load stem 50 and of the nuts 42 and 43 will, ordinarily at least, be so chosen that the nut need be rotated through only a fraction of a revolution, for example 120°, to return the nut downwardly, during the non-thrust-applying portion of its cycle, to its desired position. Nevertheless, in a high speed roller actuator there is very little time for rotation of the nut 42 or 43, particularly since the nut must each time be started from a completely stopped non-rotating condition and inertial forces must be overcome.

The concentric actuator disclosed in the present application solves the problem suggested above by, in effect, dividing the upper nut into two parts, an upper rotatable nut 42 and a lower non-rotatable part 40, the upper part 42 being the smaller. Since it is only the upper part 42 which need be rotated, the inertial load to be overcome is substantially lessened. And by making the larger lower part 40 non-rotatable, a non-concentric form of the intermittent drive may be used.

The means by which the nuts 42 and 43 are driven angularly at selected portions of the cycle in timed relation with the roller actuator will now be described. Fixed to the upper end portion of cam shaft 18 and supported in plate 205 of a sub-housing 202 is a conjugate cam 80 having an upper cam disc 81 and a lower cam disc 82 separated by a spacer disc. Each of the cam discs 81 and 82 has but a single cam lobe, 83 and 84, respectively. The lobes 83 and 84 are angularly adjacent to each other, as indicated in the drawing. Mounted for rotation on shafts 92 and 93, on either side of the conjugate cam 80, are cam follower assemblies 90 and 91, respectively, the shafts 92 and 93 being parallel and in alignment with the shaft 18 on which the conjugate cam 80 is mounted. The two cam follower assemblies 90 and 91 are similar, so that it will be necessary to describe but one of them. Cam follower assembly 90 which controls the rotation of the lower nut 43 will be described.

Figure 10:
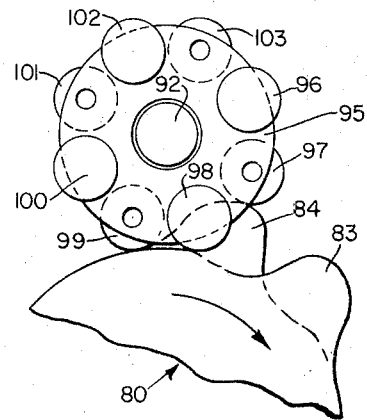
FIGS. 8–10 are sequential diagrammatic views illustrating the action of the conjugate cam and cam followers of the intermittent motion mechanism at the start, middle, and end of a 90° rotational movement.
Figure 9:
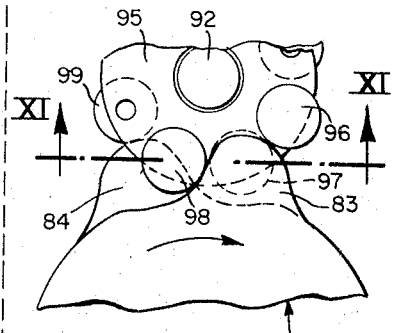

The cam follower assembly 90 includes a circular disc 95 fixed to the shaft 92. Supported in disc 95 and projecting upwardly therefrom at 90° angular spacings are four cam followers, identified as 96, 98, 100 and 102. Projecting downwardly from the circular disc 95 are four other cam followers, also at 90° spacings but so disposed angularly as to be located mid-way between the upper cam followers. For each revolution of conjugate cam 80 on its shaft 18, the cam follower assembly 90 is rotated through 90° on shaft 92. The action is illustrated in FIGS. 8, 9 and 10.

Figure 8:
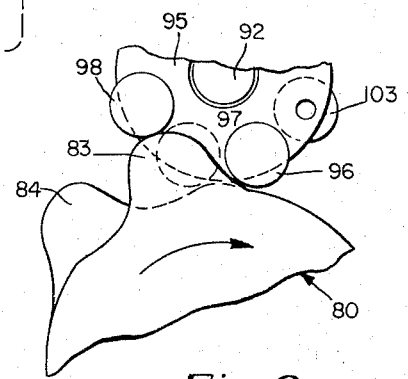
Figure 11:
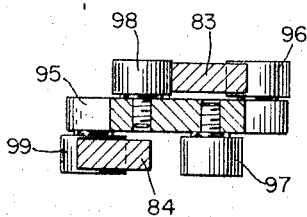
FIG. 11 is an elevational view along the line XI—XI of FIG. 9.

In FIG. 8, the conjugate cam 80 is rotating in the clockwise direction as indicated by the arrows, and lobe 83 of the upper disc 81 is about to make contact with the upper follower 96. As the lobe 83 continues in the clockwise direction, it moves the follower 96 from the angular position shown in FIG. 8 to the angular position shown in FIG. 9. An instant later, the lobe 84 of the lower disc 82 of the conjugate cam assembly 80, contacts the lower follower 97 and moves the lower follower 97 from the position shown in FIG. 9 to the position shown in FIG. 10. This completes one cycle of angular movement of the cam follower assembly 90 on its shaft 92. It will be seen that the cam follower assembly 90 has been rotated at 90° in the counter-clockwise direction. This is evident in the drawing from the fact that the upper cam follower 96 is moved from its original position, shown in FIGS. 2 and 8, to the position occupied by the follower 102 in FIG. 2. It will be understood that the follower assemblies 90 and 97 could, if desired, have a different number of followers than the number shown and described above, and that the angular rotation for each movement could be other than 90°.

It will be seen from the drawings that when the cam follower assembly 90 is rotated through 90° in the counter-clockwise direction, as viewed in FIG. 2, the pinion 66 and gear 67 are driven rotationally clockwise on shaft 69 which causes counter-clockwise rotation of a pinion 68 located in the slot 71 in the non-rotatable thrust member 40. Pinion 68 is in mesh with the lower nut 43, and in this fashion the lower nut 43 is driven angularly in the clockwise direction at intermittent timed instants. The gear ratios and timing are so selected that the lower nut 43 is moved angularly during the period that the inner rollers 33 are rolling down the downwardly inclined ramp between the points a and b. For, as previously described, it is during this period that the upper inner non-rotatable cam 35 is moving vertically downwardly, maintaining contact with the downwardly moving rollers 33. During this same portion of the cycle, the lower nut 43 is being moved vertically upwardly by reason of the upwardly linear movement of the shaft 50. Thus, the engaged teeth of the nut 43 slide upward in the teeth of pinion 68 but maintain engagement therewith.

The angular movement of the lower nut 43, just described, returns the inner nut 43 downward to close the gap which developed between the undersurface of nut 43 and the upper surface of the non-rotatable inner cam 35 during that part of the cycle when the cam 35 is falling down and the nut 43 is being carried upwardly on stem 50. The timing is such that the gap does not become fully closed until the inner cam 35 starts to rise in response to the thrust of the rollers 33 as they start to roll up the inclines of cam surfaces 27.

During that other part of the cycle when the inner nut 43 is performing its thrust-applying function, and the upper nut 42 is not contributing any thrust, the upper nut 42 is returned downwardly through similar intermittent gear train mechanism comprising the cam follower assembly 91, and the pinions and gears 75, 76, 77 and 78. This upper gear train is driven by the conjugate cam 80 at a time in the cycle which is 180° out of phase with respect to the time at which the cam 80 drives the lower intermittent gear train.

Using the non-concentric form of intermittent drive disclosed in the present application has several advantages over the concentric form of intermittent drive in which the intermittent-movement mechanism is driven by the peripheral teeth of a driving gear or ring whose center axis of rotation is coaxial with that of the stem 50. In the first place, a lower peripheral speed is required. In the concentric form of drive, the peripheral speed required of the driving gear would be very high as compared with the peripheral speed of the conjugate cam 80 and as compared with the peripheral speed required at the toothed edges of nuts 42 and 43.

The non-concentric form of intermittent drive also has the advantage that it is fully and separately containable within a separate sub-housing 202 which may be quickly and easily attached to and removed from the main housing 201. The gear 68, which is located within the access slot 71 and is rotatable about a shaft 70 which is an integral part of the thrust member 40, remains in the access slot 71 when the intermittent-gearing sub-housing 202 is removed.

The smaller diameters of the various component parts of the non-concentric intermittent mechanism disclosed in the present application also have this advantage—they are less difficult to manufacture to the close tolerances required of the intermittent system.

The roller actuator mechanism shown in FIGS. 1–6 of the drawings, and described thus far, is adapted to provide a heavy-load thrust in only one direction, which in the description thus far has been assumed to be an upward direction. However, as indicated previously, the roller actuator may be used in a horizontal position in which case the heavy-load direction may, for example, be to the left and the no-load direction to the right.

To return the stem 50 in the no-load direction, a nut 150 is threaded loosely on stem 50 and supported, as by bearings, in the main base plate. The threads of the nut 150 are disposed between the threads of the stem 50, with clearance on both sides of the threads. The nut 150 is driven continuously and synchronously with the actuator, by a gear train 151 which includes a pinion 152 secured to the lower end of shaft 22. Thus, during normal operation of the roller actuator in the direction of the load, the nut 150 merely turns on the stem 50. It does no work and it introduces no load.

In those installations in which the stem 50 is horizontally disposed, when the stem is to be returned in the no-load direction, the roller actuator mechanism is rotated in the reverse direction. The nut 150 now supplies thrust in the no-load direction.

In those installations in which the stem 50 is vertically disposed, and in which the direction of heavy load is upward, return of stem 50 in the no-load or down direction is also accomplished by rotating the roller actuator in the opposite direction, but in this case the necessary thrust in the no-load direction is provided by the weight of the load and the nut 150 acts as an anti-jam mechanism.

The action of the cams and nuts of the roller actuator when operating in the no-load direction will be clear from the following brief description of the actuator of FIGS. 1–6. It will be assumed that the stem 50 is vertical and that the direction of heavy load is up.

Assume a period in the return cycle when the outer rollers 32 are rolling down the long ramp from a to b, and the inner roller 33 are rolling up the short incline which extends from b to a. The outer non-rotatable cam 34 is falling, and so is the thrust member 40, the upper nut 42, and the stem 50. The weight of the load is, therefore, borne by the members 42, 40, 34, 32, 26, 203, 204 and 200 of FIG. 1. The lower inner nut 43 is, during this stage of the return cycle, rotated by the intermittent mechanism in a direction to move the nut 43 upward on the stem 50 in time to allow the non-rotatable cam 35 to be lifted by the inner rollers 33. Thus, when the inner rollers 33 reach the peak a, the cam 35 will abut against the undersurface of nut 43 and be in position to assume a portion of the load. By the time the inner rollers 33 reach a point on the down ramp below point a by a distance equal to c–b, the outer rollers 32 will be about to climb the up ramp from b to a. At this time, the inner rollers 33 will assume the full load, and the upper nut 42 will be rotated upward on the stem 50 to allow the outer rollers 32 to lift the non-rotatable cam 34 and thrust member 40. By the time the outer rollers 32 reach the peak a, the non-rotatable cone 40 will abut against the undersurface of the nut 42 ready to assume a part of the load.

The principal advantages of the concentric type of roller actuator shown in the present application, in comparison with the non-concentric form shown in Maroth U.S. Patent 2,836,985, are that only one thrust bearing and one thrust plate are required, and that a heavy housing section is not required to transmit the load from the upper nut and upper cam to the base. In the one-way actuator of FIG. 1, the single thrust bearing is 204, the single thrust plate is 200, and the relatively light housing is 201. When the roller actuator is being operated in the direction of the main load, which has been assumed to be up in FIG. 1, there is a downward force on thrust plate 200 equal to the upward thrust on the nuts 42, 43, and the thrust plate 200 provides the necessary reaction force. When the roller actuator is being driven in the opposite or no-load direction and the roller actuator is functioning in its intended normal manner to lower the main load, there is again a downward force on thrust plate 200. If the downward movement of stem 50 should become halted while the actuator was still being driven, the nut 150 would come into play as an anti-jam device, and it would pull the stem 50 downward. In this case, there would be an upward force on thrust plate 200. It will be seen then that the single thrust plate 200 takes the thrust in both directions.

To provide against bending or deflection of the stem 50 in the radial direction, a pair of radial support sleeves 160 and 161 are provided at spaced apart points, one above and the other below the pair of nuts 42, 43. Sleeves 160 and 161, which are preferably bronze, have inside diameters which are of substantially the same dimensions as (but very little larger than) the outside diameter of the threaded stem 50 so that there is very little clearance. These sleeves stabilize the stem 50 radially.

Figure 12:
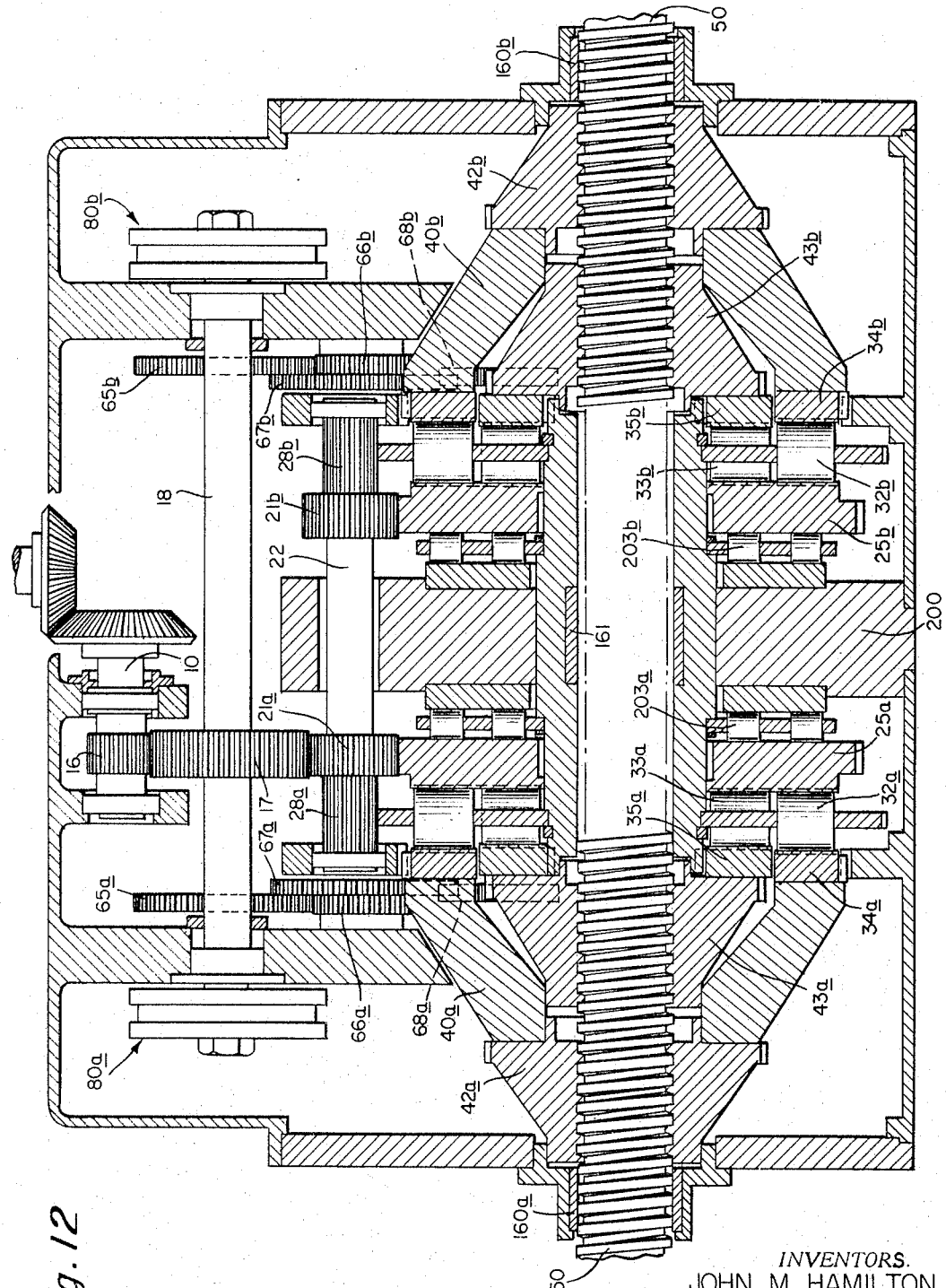
FIG. 12 is an elevational view in section of a two-way roller actuator, otherwise generally similar to the one-way roller actuator of FIG. 1.

The roller actuator of FIG. 1, as has been indicated previously, is a one-way device. That is to say, the actuator of FIG. 1 is capable of applying a heavy thrust in but one direction, up in FIG. 1. FIG. 12 illustrates a two-way roller actuator having two actuator cells, each very similar to the actuator of FIG. 1.

In FIG. 12, the stem 50 may be assumed to be horizontally disposed. The actuator cell on the left is used to drive the stem 50 toward the left. The cell on the right is used to drive the stem 50 to the right. The same reference numerals as were used in FIG. 1 will be used to identify similar parts in FIG. 12. Where necessary, the suffix *a* will be added to the numerals of the left-hand cell, and the suffix *b* will be added to the numerals of the right-hand cell.

It is not believed necessary to describe in detail the two-way roller actuator of FIG. 12. As indicated above, each of the two cells of FIG. 12, the left cell and the right cell, are essentially the same as the single cell of the one-way actuator of FIG. 1. In the operation of the two-way actuator, the nuts of one of the cells function in the manner described for FIG. 1 for driving the stem in the direction of the main load, while at the same time the pair of nuts of the other cell are functioning in the manner described for FIG. 1 for returning the stem in the no-load direction. The thrust, for load movement in either direction, is taken by the single thrust plate 200. Thus, the housing may be constructed of light material. This is a distinct advantage. Also, as in the case of FIG. 1, stability against deflection in the radial direction of the stem 50 is achieved by the bronze sleeves 160a 160b and 161.

In the roller actuator of FIG. 1 (and also of FIG. 12) the contours of the rotatable power cam 25 and of the non-rotatable thrust cams 34, 35 have been assumed to be complementary and the inclined slopes parallel to each other. This is illustrated diagrammatically in FIG. 13 where the rising slope of the lower rotatable cam 25 is shown to be parallel with the slope of the upper non-rotatable cam 34. The input drive shaft 10 (FIGS. 1 and 12) is ordinarily driven by a worm and worm gear drive (not shown) which provides a locking force against movement in a direction opposite to that in which the worm is being driven.

Consider now the situation which exists when the roller actuator is stopped after being driven in a direction to lift the main load, and before the load is removed from the stem 50. That is to say, consider the situation where the roller actuator is required to support the load in a fixed position. The downward force caused by the weight of the load on the roller R is represented in FIG. 13 by the vector P. This force has a component $P_1$ which is perpendicular to the slope of cam 34 and which is impressed on the roller R. An equal and opposite reaction force $P_2$ is impressed on the undersurface of roller R. The force components which tend to move the roller R laterally are equal and opposite, and the net force laterally on the roller R is zero. Thus, there is no lateral force on the roller retainer 29. There is, however, a lateral force component $H_1$ which tends to move the cam 34 to the left, as viewed in FIG. 13, and an equal force component $H_2$ which tends to move cam 25 to the right. Cam 34 is fixed against rotation, being keyed to the housing. Cam 25 is locked against rotation by the worm and worm gear drive referred to above. The forces tending to move the rotatable cam 25 are kept as small as possible by making the angle of incline $A_2$ small. And, where the slopes are parallel the angle $A_1$ of the upper fixed cam equals the angle $A_2$.

It will be seen then that in designing a roller actuator of the type shown in FIGS. 1 and 13, the angle of incline $A_2$ of the rotatable power cam 25 is kept small enough to make the actuator self-locking, that is, the angle $A_2$ is kept small enough that the worm drive is able to provide the necessary locking force. With the angles $A_1$ and $A_2$ equal and small, high rotational cam speeds and rapid intermittents are necessary to obtain moderately high speed of the load stem 50. In fact, the maximum linear speed of the load stem 50 is limited by the peripheral cam speed and the number of intermittents.

Consider now the situation if the slope $A_1$ of the fixed cam 34 (or 35) be increased while the slope angle $A_2$ of the rotatable cam 24 be reduced. Increasing the angle $A_1$ has no effect on the cam 34, so far as supporting a fixed load of stem 50 is concerned, since cam 34 is fixed. Decreasing the angle $A_2$ reduces, however, the lateral force impressed by the weight of the load on the rotatable cam 25, and thus, so far as cam 25 is concerned, improves the self-locking ability of the actuator. However, with the cam slopes non-parallel, a horizontal force component is imposed by the weight of the load on the roller R and on the roller retainer 29, as is indicated in FIG. 14 by the arrow. But if the slope angle $A_2$ be kept very small, for example, of the order of thirty minutes or one-half degree, the lower cam 25 will be self locking and will not move under the weight of the load. With neither of the cams 34 or 25 movable, the roller R cannot roll, and will not move laterally unless and until the lateral force is great enough to overcome the frictional forces involved in a sliding, as distinguished from a rolling movement of the roller. Thus, designing the cam contours to be non-parallel may have an advantage so far as the self-locking characteristics of the actuator are concerned. In the diagrammatic illustration in FIG. 14, the non-parallel feature of the cam surfaces is exaggerated in order to bring out the point. In practice, the departure from parallel would be less than indicated in FIG. 14.

While the preferred embodiments of this invention have been described in some detail, it will be obvious to one skilled in the art that various modifications may be made without departing from the invention as hereinafter claimed.

What is claimed is:
1. A rotary-to-linear-motion actuator comprising:
   (a) a threaded stem;
   (b) rotatable annular inner and outer cam surfaces concentric about said stem, each of said cam surfaces having a contour which includes a plurality of peaks defined by raising and falling inclined slopes;
   (c) non-rotatable inner and outer cam surfaces mounted for movement in the axial direction of said stem;

(d) inner and outer sets of rolling elements between the rotatable and non-rotatable inner and outer cam surfaces, respectively, said rolling elements of the inner set reaching the cam peaks in out of phase relation relative to the rolling elements of the outer set;

(e) first and second nuts threaded for rotation on said stem, the first of said nuts being disposed for abutment against the non-rotatable inner cam;

(f) non-rotatable thrust means between the non-rotatable outer cam and the second nut and disposed for abutment against said second nut;

(g) power means for driving the rotatable cam surfaces rotationally;

(h) said first and second nuts being moved axially in response to thrust forces applied when the rolling elements are rolling up the rising slopes of the rotatable cam surfaces, the one nut being moved axially in out-of-phase relation relative to the axial movement of the other nut;

(i) and intermittent means coupled to said power means for rotating the first nut and second nut in out-of-phase relation to return the first nut toward the non-rotatable inner cam when said non-rotatable inner cam is in the non-force-applying portion of its cycle and to return the second nut toward the non-rotatable thrust means when the non-rotatable outer cam is in the non-force-applying portion of its cycle.

2. Apparatus as claimed in claim 1 characterized in that an access slot is provided in the non-rotatable thrust means to allow the intermittent means to be coupled to the first nut.

3. Apparatus as claimed in claim 2 characterized in that said intermittent means includes
   (a) intermittent cam means mounted for rotation on a cam shaft coupled to the power drive means,
   (b) first and second cam follower assemblies adapted to be engaged by the intermittent cam means and to be moved angularly through a fraction of a revolution in 180° out-of-phase relation relative to each other; and
   (c) first and second gear trains coupling said first and second cam follower assemblies, respectively, to said first and second nuts for driving said nuts rotationally in out-of-phase relation, said first gear train including a gear disposed in the access slot of said non-rotatable thrust means.

4. Apparatus as claimed in claim 3 characterized in that:
   (a) a third nut is threaded on said stem fixed against axial movement; and in that
   (b) gear means couple said power drive means to said third nut for driving said third nut continously at a rate which is synchronized with the axial movement of the stem.

5. Apparatus according to claim 4 characterized in that the non-rotatable thrust means is of conical shape with the large diameter end abutting against the no-rotatable outer cam, said conical thrust means encompissing said first nut.

6. Apparatus according to claim 5 characterized in that said actuator is housed in a housing of relatively light construction, and in that a single heavy thrust plate is provided for taking the thrust of the actuator in both directions of movement of the stem.

7. Apparatus according to claim 6 characterized in that support sleeves are provided at spaced points along said stem to provide support against stem deflection in the radial direction.

8. Apparatus according to claim 7 characterized in that the intermittent cam means, the first and second cam follower assemblies, and the first and second gear trains are (except for the gear in the access slot) contained in a separate sub-housing which is attachable to and removable from the main housing.

9. Apparatus according to claim 8 characterized in that said intermittent cam means includes conjugate cam.

10. Apparatus according to claim 9 characterized in that said rotatable and non-rotatable cam surfaces are complementary.

11. Apparatus according to claim 9 characterized in that said rotatable and non-rotatable cam surfaces are non-complementary.

References Cited
UNITED STATES PATENTS

| | | | |
|---|---|---|---|
| 2,151,094 | 3/1939 | Fiorentino | 74—424.8 |
| 2,583,775 | 1/1952 | Hyde | 74—424.8 |
| 2,836,985 | 6/1958 | Maroth | 74—424.8 |
| 3,008,340 | 11/1961 | Chillson | 74—424.8 |
| 3,090,360 | 5/1963 | Bennet et al. | 91—36 |
| 3,266,333 | 8/1966 | Maroth | 74—424.8 |

DONLEY J. STOCKING, *Primary Examiner.*

LEONARD H. GERIN, *Examiner.*